United States Patent [19]
Hickner

[11] Patent Number: 5,216,045
[45] Date of Patent: Jun. 1, 1993

[54] CONTROLLED FILM BUILD EPOXY COATINGS USING GLYCIDYL ETHERS OF OXYALKYLATED AROMATIC AND CYCLOALIPHATIC DIOLS

[75] Inventor: Richard A. Hickner, Lake Jackson, Tex.

[73] Assignee: The Dow Chemical Company, Midland, Mich.

[21] Appl. No.: 782,926

[22] Filed: Oct. 25, 1991

Related U.S. Application Data

[63] Continuation-in-part of Ser. No. 464,501, Jan. 12, 1990, abandoned, which is a continuation-in-part of Ser. No. 143,772, Jan. 13, 1988, abandoned.

[51] Int. Cl.$^5$ .................. C08K 3/20; C08F 283/00; C08G 59/50; C08L 63/02
[52] U.S. Cl. ..................... 523/403; 523/404; 525/524; 525/525; 525/528
[58] Field of Search ............ 525/524, 525, 528; 523/404, 403

[56] References Cited

U.S. PATENT DOCUMENTS

| | | | |
|---|---|---|---|
| 4,507,461 | 3/1985 | Bowditch | 528/104 |
| 4,737,553 | 4/1988 | Gannon et al. | 525/481 |
| 4,829,104 | 5/1989 | McIntyre et al. | 523/403 |
| 4,845,172 | 7/1989 | Brytus et al. | 525/481 |
| 4,857,567 | 8/1989 | Laugal et al. | 523/415 |
| 4,863,575 | 9/1989 | Anderson et al. | 528/103 |
| 4,868,230 | 9/1989 | Rao et al. | 523/403 |
| 4,883,572 | 11/1989 | Rao et al. | 523/403 |

FOREIGN PATENT DOCUMENTS 0199663 10/1986 European Pat. Off. .
0315164 3/1988 European Pat. Off. .

OTHER PUBLICATIONS

Chem. Abs. 112:8764d (1990).

Primary Examiner—Marion E. McCamish
Assistant Examiner—Susan Berman

[57] ABSTRACT

Advanced epoxy cationic resins are prepared from an epoxy-based resin containing oxirane groups by converting at least some of the oxirane groups to cationic groups is improved by using as the epoxy-based resin a blend of (I) an epoxy-based resin obtained by reacting in the presence of a suitable catalyst (1) a diglycidylether of an oxyalkylated aromatic or cycloaliphatic diol, such as a condensation product of bisphenol A, ethylene oxide and epichlorohydrin, optionally (2) a diglycidylether of a dihydric phenol, for example a diglycidyl ether of bisphenol A, (3) a dihydric phenol such as bisphenol A, and optionally (4) a capping agent such as p-nonylphenol and (II) a different cationic epoxy-based resin. Such resin blends can be utilized in cathodic electrodeposition coating systems. Use of the diglycidylether of an oxyalkylated diol provides coating compositions with lower viscosity and produces deposition coatings of higher film build and better surface appearance than compositions without this component.

8 Claims, No Drawings

CONTROLLED FILM BUILD EPOXY COATINGS USING GLYCIDYL ETHERS OF OXYALKYLATED AROMATIC AND CYCLOALIPHATIC DIOLS

CROSS-REFERENCE TO RELATED APPLICATION

This application is a continuation-in-part of application Ser. No. 07/464,501 filed Jan. 12, 1990, now abandoned, which is a continuation-in-part of application Ser. No. 07/143,772 filed Jan. 13, 1988, now abandoned, all of which are incorporated herein by reference in their entirety.

FIELD OF THE INVENTION

The invention is concerned with the preparation of coating compositions from epoxy-based resins and their application by cathodic electrodeposition.

BACKGROUND OF THE INVENTION

Electrode position has become an important method for the application of coatings over the last two decades and continues to grow in popularity because of its efficiency, uniformity and environmental acceptance. Cathodic electrodeposition has become dominant in areas where highly corrosion-resistant coatings are required, such as in primers for automobile bodies and parts. Epoxy based systems provide the best overall performance in this application and are widely used.

Cathodic electrodeposition resins based on conventional epoxies obtained by reacting liquid diglycidyl ethers of bisphenol A with bisphenol A to produce higher molecular weight epoxy resins have known disadvantages. Such products tend to have excessively high softening points resulting in poor flow out. In addition, such products require excessive amounts of solvent during their preparation. In order to improve flow, it has been proposed to modify such conventional epoxy resins by reaction with a diol in the presence of a tertiary amine catalyst. Thus, Bosso et al., U.S. Pat. No. 3,839,252, describes modification with polypropylene glycol. Marchetti et al., U.S. Pat. No. 3,947,339, teaches modification with polyesterdiols or polytetramethylene glycols. Wismer et al., U.S. Pat. No. 4,419,467, describes still another modification with diols derived from cyclic polyols reacted with ethylene oxide. These various modifications, however, also have disadvantages. Tertiary amines or strong bases are required to effect the reaction between the primary alcohols and the epoxy groups involved. Since these reactions require long reaction times, they are subject to gellation because of competitive polymerization of the epoxy groups by the base catalyst. In addition epoxy resins containing low levels of chlorine are required to prevent deactivation of this catalyst.

Many coating formulations applied by electrodeposition include pigments to provide color, opacity, application, or film properties. U.S. Pat. No. 3,936,405, Sturni et al., describes pigment grinding vehicles especially useful in preparing stable, aqueous pigment dispersions for water-dispersible coating systems, particularly for application by electrodeposition. The final electrodepositable compositions, as described, contain the pigment dispersion and an ammonium or amine salt group solubilized cationic electrodeposition epoxy-containing vehicle resin and other ingredients typically used in electrodeposition compositions. Among the kinds of resins used are various polyepoxides such as polyglycidyl ethers of polyphenols, polyglycidyl ethers of polyhydric alcohols and polyepoxides having oxyalkylene groups in these epoxy molecule.

U.S. Pat. Nos. 4,419,467 and 4,575,523 describe the reaction of an epoxy resin with oxyalkylated diols to form resins useful in electrodeposition. Such reactions have several attendant disadvantages, such as described in U.S. Pat. No. 4,260,720, Col. 1, lines 25-51. Use of the glycidyl ethers of such a diol, as described herein, eliminates or greatly reduces these problems.

U.S. Pat. No. 4,260,720 teaches the use of glycidyl ethers of cyclic polyols, including oxyalkylated polyphenols, in combination with polymercapto compounds to form electrodeposition resins. These glycidyl ethers were not used in combination with glycidyl ethers of polyphenols and polyphenols, as described herein, nor were there advantageous properties as modifiers for bisphenol A-based epoxy resins in electrodeposition anticipated, such as improvement in film thickness and appearance.

Moriarity el al. disclose in U.S. Pat. No. 4,432,850 an aqueous dispersion of a blend of (A) an ungelled reaction product of a polyepoxide and a polyoxyalkylenepolyamine, which is then at least partially neutralized with acid to form cationic groups, and (B) an additional cationic resin different from (A). The resulting dispersion is applied by cathodic electrodeposition and is disclosed as providing high throw power and films which are better appearing, more flexible and more water-resistant.

Anderson et al. U.S. Pat. No. 4,575,523, discloses a film-forming resin composition which when combined with a crosslinking agent and solubilized, is capable of depositing high build coatings in cathodic electrodeposition processes. The resin is a reaction product of a modified epoxy formed by reacting a water-soluble or water-miscible polyol, an excess of polyamine, and an aliphatic monoepoxide.

Fowler, et al. U.S. Pat. No. 4,399,242 discloses aqueous epoxy resin dispersions wherein one component is the reaction product of a diglycidyl ether of a dihydric phenol, a dihydric phenol, a diglycidyl ether of a polyoxyalkylene glycol and a diisocyanate.

Bowditch describes, in U.S. Pat. No. 4,507,461, epoxy resins derived from diglycidyl ethers of oxyalkylated bisphenols advanced with bisphenol A; however, there is no suggestion that these products can be used to make cathodic electrodeposition coatings.

McIntyre, Rao and Hickner disclose in U.S. Pat. No. 4,829,104 issued May 9, 1989 an improvement in a method for preparing an advanced epoxy cationic resin from an epoxy-based resin containing oxirane groups by converting at least some of the oxirane groups to cationic groups. The improvement is stated to reside in using as the epoxy-based resin an advanced epoxy resin obtained by reacting in the presence of a suitable catalyst (1) a diglycidyl ether of a polyetherpolyol such as the condensation product of dipropylene glycol and epichlorohydrin having an epoxy equivalent weight of 185, (2) a diglycidyl ether of a dihydric phenol such as a diglycidyl ether of bisphenol A and (3) a dihydric phenol such as bisphenol A and optionally a capping agent such as p-nonylphenol.

Anderson and Hickner disclose in U.S. Pat. No. 4,863,575 issued Sep. 5, 1989 an improvement in preparing an advanced epoxy cationic resin from an epoxy-based resin containing oxirane groups by converting at least some of the oxirane groups to cationic groups. The improvement is stated to reside in using as the epoxy-based resin, an advanced epoxy resin obtained by reacting in the presence of a suitable catalyst (1) a diglycidyl ether of an oxyalkylated aromatic diol or oxyalkylated cycloaliphatic diol, (2) a diglycidyl ether of a dihydric phenol and (3) a dihydric phenol.

Rao and Hickner disclose in U.S. Pat. No. 4,868,230 issued Sep. 19, 1989 an improvement in a method for preparing an advanced epoxy cationic resin from an epoxy-based resin containing oxirane groups by converting at least a portion of the oxirane groups to cationic group. The improvement is stated to reside in using as the epoxy-based resin an advanced epoxy resin obtained by reacting in the presence of a suitable catalyst (1) a diglycidyl ether of an aliphatic diol free of ether oxygen atoms, (2) a diglycidyl ether of a dihydric phenol and (3) a dihydric phenol.

Rao and Hickner disclose in U.S. Pat. No. 4,883,572 issued Nov. 28, 1989 an improvement in a method for preparing an advanced epoxy cationic resin from an epoxy-based resin containing oxirane groups by converting at least some of the oxirane groups to cationic groups. The improvement is stated to reside in using as the epoxy-based resin an advanced epoxy resin obtained by reacting in the presence of a suitable catalyst (1) a diglycidyl ether of an aliphatic diol which is essentially free of ether oxygen atoms, such as a diglycidyl ether of 1,4-butanediol, (2) a diglycidyl ether of a dihydric phenol such as a diglycidyl ether of bisphenol A and (3) a dihydric phenol such as bisphenol A and optionally a capping agent such as p-nonylphenol.

The automobile industry still has needs in the areas of controlled film thickness. The ability to build thicker, uniform films which are smooth and free of defects will allow the elimination of an intermediate layer of paint known as a primer surface or spray primer, previously required to yield a sufficiently smooth surface for the topcoat. Such an elimination results in removal of one paint cycle and provides more efficient operations. Thicker electrocoat primers may also provide improved corrosion resistance.

SUMMARY OF THE INVENTION

The present invention is directed to a blend of
(I) an additive cationic resin which is an advanced epoxy-based cationic resin prepared by reacting in the presence of a suitable catalyst
  (A) a composition comprising (1) from 20 to 100, preferably from 30 to 100, weight percent of a diglycidyl ether of an oxyalkylated aromatic, oxyalkylated cycloaliphatic diol or certain oxyalkylated aliphatic diols, and (2) from zero to 80, preferably from zero to 70, weight percent of a diglycidyl ether of a dihydric phenol with
  (B) at least one dihydric phenol and optionally,
  (C) a monofunctional capping agent; wherein components (A) and (B) are employed in such quantities that the resultant advanced epoxy resin has an average epoxide equivalent weight of from 350 to 10,000 and preferably from 600 to 3,000, whereby there is formed an advanced epoxy resin having terminal oxirane groups and subsequently converting at least some of the oxirane groups to cationic groups and
(II) a different epoxy-based cationic cathodic electrodeposition resin;

wherein component (I) is present in an amount of from about 10 to about 90 percent by weight based upon the combined weight of components (I) and (II) and component (II) is present in an amount of from about 90 to about 10 percent by weight based upon the combined weight of components (I) and (II).

The present invention is also directed to a process for the preparation of an advanced epoxy cationic resin from an epoxy resin composition having terminal oxirane groups which includes the step of converting oxirane groups to cationic groups by reacting a nucleophilic compound with at least some of the oxirane groups of the epoxy resin composition wherein an organic acid and water are added during some part of this conversion characterized by using as the epoxy resin composition a blend of
(I) an additive epoxy resin which is an advanced epoxy resin obtained by reacting in the presence of a suitable catalyst
  (A) a composition comprising (1) from 20 to 100 weight percent of a diglycidylether of an oxyalkylated aromatic, oxyalkylated cycloaliphatic diol or certain oxyalkylated aliphatic diols, and (2) from zero to 80 weight percent of a diglycidylether of a dihydric phenol, and
  (B) at least one dihydric phenol wherein components (A) and (B) are employed in such quantities that the resultant epoxide equivalent weight is from 350 to 10,000, and
(II) a different epoxy-based resin
wherein at some time during preparation of the epoxy resin composition, the resins are individually or jointly, converted to cationic resins whereby there is obtained a blend of the additive cationic epoxy resin and a different cationic epoxy-based resin; said blend having a charge density of from 0.2 to 0.8 milliequivalent of charge per gram of resin and containing from about 10 to about 90 percent of Component (I) and from about 90 to about 10 percent of Component (II) based on the combined weight of components (I) and (II).

The present invention is also directed to a coating composition comprising an aqueous dispersion of a mixture of the above-described additive cationic epoxy resin with a different epoxy-based cationic resin and a method for coating such compositions.

DETAILED DESCRIPTION OF THE INVENTION

Unexpectedly, incorporation of resins containing the advanced glycidyl ethers of oxyalkylated aromatic diols, oxyalkylated aliphatic diols into the blends confer to cathodically electrodepositable coating compositions produced therefrom the ability to build thicker films having controlled thickness during the electrodeposition process, as compared to a similar composition using an epoxy resin not containing the oxyalkylated diol/glycidyl ether component. The ability to deposit thicker films is highly desirable for reducing the number of paint applications required while improving the corrosion resistance and appearance of the electrodeposited coating. The film thickness can be controlled by adjusting the amount of the diglycidylether of an oxyalkylated diol incorporated into the epoxy resin. Generally, thickness increases with increasing content of this component.

Another advantage is that the blends of cationic epoxy resins containing the diglycidylether of an oxyalkylated aromatic diol, oxyalkylated cycloaliphatic diol, or certain oxyalkylated aliphatic diol have a lower viscosity at a given temperature than unmodified cationic resins of the same molecular weight. This lower viscosity allows the use of higher molecular weight resins and/or less solvent to achieve a viscosity comparable to an unmodified resin. The lower viscosity cationic resins allow the coating composition greater flowout during deposition and curing which results in better appearance. Alternatively, the lower viscosity cationic resins enable curing at lower temperatures to give equivalent flow and appearance. The improved flowout results in smoother films which are characterized by a greater distinctness of image (DOI) value. Finally, coatings produced using these epoxy resins have greater flexibility due to incorporation of the diglycidylether of an oxyalkylated aromatic diol, oxyalkylated cycloaliphatic diol, or certain oxyalkylated aliphatic diol component as compared to those based on similar resins not containing that component.

All of the coating compositions of the invention provide useful cathodically electrodepositable coatings having improved flowout, film build, and flexibility properties due to the incorporation of the resin containing the diglycidyl ether of an oxyalkylated aromatic diol, oxyalkylated cycloaliphatic diol, or certain oxyalkylated aliphatic diol as a component of the blend.

The starting epoxy resin component for preparing the advanced epoxy cationic resin required for the mixture of resins of this invention is an advanced resin prepared by reacting a composition comprising a glycidyl ether of an oxyalkylated aromatic diol, oxyalkylated cycloaliphatic diol, or certain oxyalkylated aliphatic diols, component (A-1), and optionally a glycidyl ether of a dihydric phenol, component (A-2), with a dihydric phenol, component (B), and optionally, a monohydric capping agent, component (C). Glycidyl ethers of dihydric phenols useful for the preparation of these resins are those having at least one, and preferably an average of two, vicinal epoxide groups per molecule. These polyepoxides can be produced by condensation of an epihalohydrin with a polyphenol in the presence of a basic acting substance.

Useful glycidyl ethers of dihydric phenols are represented by Formulae I and II:

FORMULA I

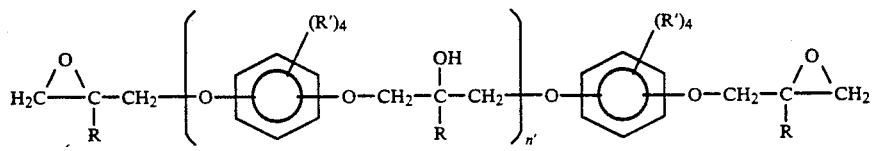

FORMULA II

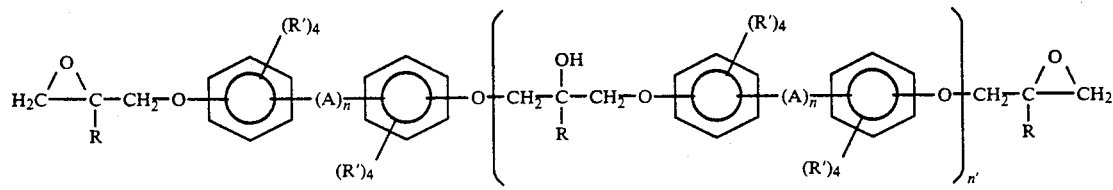

wherein A is a divalent hydrocarbon group having suitably from 1 to 12, more suitably 1 to 6, carbon atoms, —S—, —S—S—, —SO$_2$—, —SO—, —CO—, —O—CO—O—, or —O—; each R is independently hydrogen or a hydrocarbyl group having from 1 to 3 carbon atoms; each R' is independently hydrogen, a hydrocarbyl or hydrocarbyloxy group having from 1 to 4 carbon atoms, or a halogen, preferably chlorine or bromine; n has a value of zero or 1; and n' has a value suitably from zero to 10, more suitably from 0.1 to 5.

The term hydrocarbyl as employed herein means any aliphatic, cycloaliphatic, aromatic, aryl substituted aliphatic or cycloaliphatic, or aliphatic or cycloaliphatic substituted aromatic groups. Likewise, the term hydrocarbyloxy means a hydrocarbyl group having an oxygen linkage between it and the object to which it is attached.

Dihydric phenols useful for the production of these polyepoxides include 2,2-bis(4-hydroxyphenyl)-propane (bisphenol A), 1,1-bis(4-hydroxyphenyl)ethane, bis(4-hydroxyphenyl)methane (bisphenol F), p,p'-hydroxybiphenyl, resorcinol, hydroquinone, or the like. The particularly preferred polyglycidyl ethers of polyphenols are the diglycidyl ether of bisphenol A and the oligomeric polyglycidyl ethers of bisphenol A.

The diglycidyl ethers of oxyalkylated aromatic diols, oxyalkylated cycloaliphatic diols or certain oxyalkylated aliphatic diols useful in the preparation of the cationic, advanced epoxy resins of the present invention are those which can be represented by the following formulas III and IV:

FORMULA III

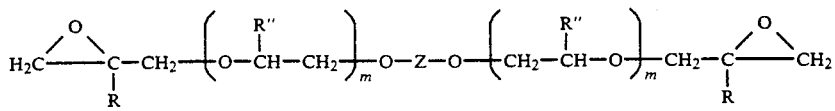

FORMULA IV

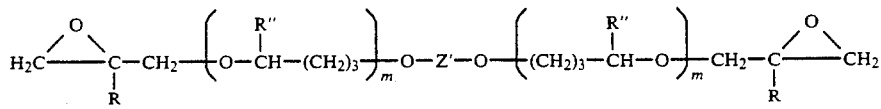

wherein R is as hereinbefore defined; R″ is hydrogen or an alkyl group having suitably from 1 to 6, more suitably from 1 to 4, carbon atoms; each m is independently an integer suitably from 1 to 15, more suitably from 1 to 10, most suitably from 1 to 5; and Z is a divalent aromatic or cycloaliphatic group having suitably from 2 to 20, more suitably from 2 to 12, carbon atoms of Z is a group represented by the following formulas A, B, C, D, E, F, G, H or I:

Formula A

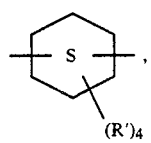

Formula B

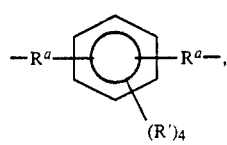

Formula C

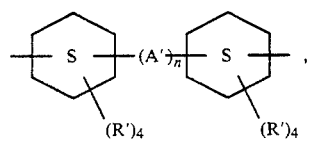

Formula D

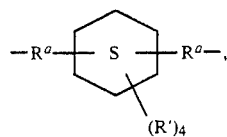

Formula E

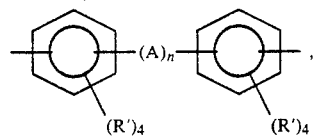

Formula F

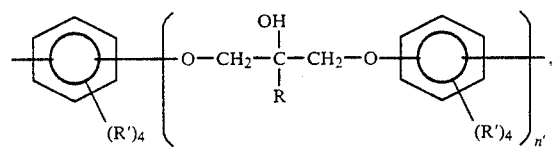

Formula G

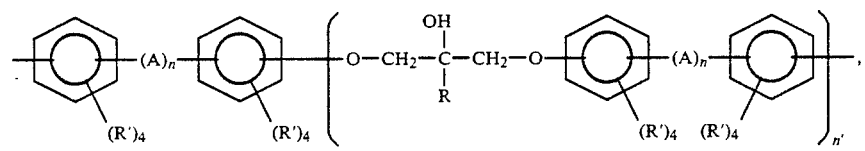

Formula H

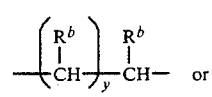

or

Formula I

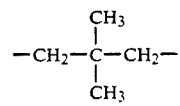

and Z′ is represented by formulas A, B, C, D, E, F, G, I and the following formula J:

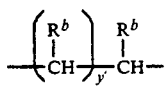

Formula J wherein A, R, R', R'', n, and n' are defined as hereinbefore; A' and $R^a$ are divalent hydrocarbon groups having from 1 to about 6 carbon atoms; and $R^b$ is hydrogen or an alkyl group having from 1 to 6 carbon atoms; y has a value suitably from about 2 to about 19, more suitably from about 5 to about 10, most suitably 5; and y' suitably has a value of 2 or from 4 to about 19, more suitably a value from 5 to about 10, most suitably 5.

The glycidyl ethers of the oxyalkylated diols are produced by the condensation of an epihalohydrin with an oxyalkylated polyol represented by the following formulae V or VI:

FORMULA V

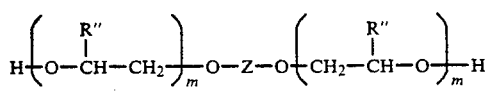

FORMULA VI

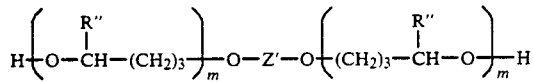

wherein R'', Z, Z', and m are defined as hereinbefore. The resulting halohydrin produce is then dehydrohalogenated by known methods with a basic acting substance, such as sodium hydroxide to produce the corresponding diglycidyl ether.

The oxyalkylated diols of Formulae V and VI are produced by reacting a diol of the formulae VII and VIII

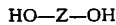 HO—Z—OH (FORMULA VII)

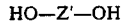 HO—Z'—OH (FORMULA VIII)

wherein Z and Z' is defined as hereinbefore, with the appropriate molar ratio of ethylene oxide, propylene oxide, butylene oxide, tetrahydrofuran, or mixtures thereof. Examples of useful diols include, for example, 1,4-butane diol, 1,6-hexanediol, neopentyl glycol, 1,12-dodecane-diol, 1,3-cyclohexanediol, 1,4-cyclohexanediol, 1,4-cyclohexanedimethanol, hydrogenated bisphenol A, bisphenol A, bisphenol F, hydroquinone, dihydroxydiphenyl oxide, p-xylenol and bisphenol capped epoxy resin.

Some of the common methods of synthesis of the diglycidylethers of oxyalkylated diols produce significant amounts of organic chloride-containing impurities. However, other processes are known for preparing products with lower levels of such impurities. While the low-chloride resins are not required for the practice of this invention, they may be used, if desired, for possible improvements in the process of preparing the resins, in the storage properties of the resins or formulated coatings made therefrom or in the performance properties of the products.

Mixtures containing the above two glycidyl ether components are reacted with a dihydric phenol and, optionally, a capping agent to produce epoxy-functional resins having the desired epoxide (oxirane) group content which are used to prepare the resins of the invention. The effective proportions of the diglycidyl ether components in the additive resin range from 20 to 100 weight percent of the diglycidylether of an oxyalkylated aromatic diol, oxyalkylated cycloaliphatic diol or certain oxyalkylated aliphatic diols, component (A-1), and from zero to 80 weight percent of the diglycidyl ether of a dihydric phenol, component (A-2). A preferred range is from 30 to 100 weight percent of the diglycidylether of an oxyalkylated diol and correspondingly from zero to 70 weight percent of the diglycidyl ether of a dihydric phenol. The proportions of the glycidyl ether components ($A=A$-1$+A$-2) and the dihydric phenol (B) are selected to provide an average epoxy equivalent weight in the advanced epoxy resin of from 350 to 10,000, preferably from 600 to 3,000. Such proportions usually are in the range of from 60 to 90 weight percent of component A and from 10 to 40 weight percent of component B. Useful diphenolic compounds include those described above as suitable for production of polyepoxide. The preferred diphenol is bisphenol A. Also useful are the bisphenols produced by chain extension of the diglycidyl ether of a bisphenol with a molar excess of a bisphenol to produce a diphenolic functional oligomeric product.

The use of capping agents such as monofunctional phenolic compounds provides the advantageous ability to reduce the epoxide content of the resulting product without chain-extension reactions and thus allows independent control of the average molecular weight and the epoxide content of the resulting resin within certain limits. Use of a monofunctional compound to terminate a certain portion of the resin chain ends also reduces the average epoxy functionality of the reaction product. The monofunctional phenolic compound is typically used at levels of zero to 0.7 equivalent of phenolic hydroxyl groups per equivalent of epoxy which would remain after reaction of substantially all of the phenolic groups of the diphenol.

Examples of useful monofunctional capping agents are monofunctional phenolic compounds such as phenol, tertiary-butyl phenol, cresol, para-nonyl phenol, higher alkyl substituted phenols, and the like. Particularly preferred is para-nonyl phenol. The total number of phenolic groups and the ratio of difunctional to monofunctional phenolic compounds, if any are used, are chosen so that there will be a stoichiometric excess of epoxide groups. Ratios are also chosen so that the resulting product will contain the desired concentration of terminal epoxy groups and the desired concentration of resin chain ends terminated by the monophenolic compound after substantially all of the phenolic groups are consumed by reaction with epoxy groups. Usually, the amount of the capping agent is from about 1 percent to about 15 percent based on the total weight of the A and B components.

These amounts are dependent on the respective equivalent weights of the reactants and the relative amounts of the epoxy-functional components and may be calculated by methods known in the art. In the practice of this invention, the desired epoxide content of the reaction product useful for preparation of the cationic resin is typically between 1 and 5 percent, calculated as the weight percentage of oxirane groups, and preferably is from 2 to 4 percent. These levels are preferred because they provide, after conversion, the desired cationic charge density in the resinous products useful in cathodic electrodeposition. These cationic resins are produced by conversion of part or all of the epoxy groups to cationic groups as described below.

Reaction of the monofunctional compound with epoxy groups of the polyglycidylether components of the reaction mixture may be done prior to, substantially simultaneously with, or subsequent to the chain-extension reactions of the diphenolic compound and the polyglycidylether components. The preferred method is to have all of the reactants present simultaneously.

Reactions of the above components to produce the epoxy resins are typically conducted by mixing the components and heating, usually in the presence of a suitable catalyst, to temperatures between 130° C. and 225° C., preferably between 150° C. and 200° C., until the desired epoxide content of the product is reached. The reaction optionally may be conducted in an appropriate solvent to reduce the viscosity, facilitate mixing and handling, and assist in controlling the heat of reaction.

Many useful catalysts for the desired reactions are known in the art. Examples of suitable catalysts include ethyltriphenylphosphonium acetate·acetic acid complex; ethyltriphenylphosphonium chloride, bromide, iodide, or phosphate; and tetrabutylphosphonium acetate. The catalysts are typically used at levels of 0.01 to 0.5 mole percent of the epoxide groups.

Appropriate solvents include aromatic solvents, glycol ethers, glycol ether esters, high boiling esters or ketones, or mixtures. Other useful solvents will be apparent to those skilled in the art. Preferred solvents are ethylene glycol monobutylether and propylene glycol monophenylether. Solvent content may range from zero to 30 percent of the reaction mixture. A solvent is usually chosen which is compatible with the subsequent cation-forming reactions and with the final coating composition so that the solvent does not require subsequent removal.

The nucleophilic compounds which are used advantageously in forming the cations required by this invention are represented by the following classes of compounds, sometimes called Lewis bases:
(a) monobasic heteroaromatic nitrogen compounds,
(b) tetra (lower alkyl)thioureas,
(c) $R^1$—S—$R^2$ wherein $R^1$ and $R^2$ individually are lower alkyl, hydroxy lower alkyl or are combined as one alkylene radical having 3 to 5 carbon atoms;

(d) 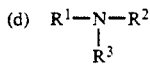

wherein $R^2$ and $R^3$ individually are lower alkyl, hydroxy lower alkyl,

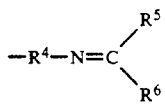

or are combined as one alkylene radical having from 3 to 5 carbon atoms, $R^4$ is an alkylene group having from 2 to 10 carbon atoms, $R^5$ and $R^6$ individually are lower alkyl and $R^1$ is hydrogen or lower alkyl, aralkyl or aryl, except that when $R^2$ and $R^3$ together are an alkylene group then $R^1$ is hydrogen, lower alkyl or hydroxyalkyl and when either or both of $R^2$ and $R^3$ is

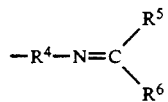

then $R^1$ is hydrogen, (e) 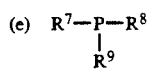

wherein $R^7$, $R^8$ and $R^9$ individually are lower alkyl, hydroxy lower alkyl or aryl.

In this specification the term lower alkyl means an alkyl having from 1 to 6 carbon atoms such as methyl, ethyl, propyl, isopropyl, n-butyl, isobutyl, n-pentyl, isopentyl, n-hexyl and isohexyl or branch chain isomers thereof.

Representative specific nucleophilic compounds are pyridine, nicotinamide, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethyl amine, diethyl amine, dibutyl amine, 2-(methylamino)ethanol, diethanolamine and the ketimine derivatives of polyamine containing secondary and primary amino groups such as those produced by the reaction of diethylene triamine or N-aminoethylpiperazine with acetone, methyl ethyl ketone or methylisobutyl ketone; N-methylpiperidine, N-ethylpyrrolidine, N-hydroxyethylpyrrolidine, trimethylphosphine, triethylphosphine, tri-n-butylphosphine, trimethylamine, triethylamine, tri-n-propylamine, tri-isobutylamine, hydroxyethyldimethylamine, butyldimethylamine, tri-hydroxyethylamine, triphenylphosphorus, and N,N,N-dimethylphenethylamine.

Substantially any organic acid, especially a carboxylic acid, can be used in the conversion reaction to form onium salts so long as the acid is sufficiently strong to promote the reaction between the nucleophilic compound and the vicinal epoxide group(s) on the resinous reactant. In the case of the salts formed by addition of acid to a secondary amine/epoxy resin reaction product, the acid should be sufficiently strong to protonate the resultant tertiary amine product to the extent desired.

Monobasic acids are normally preferred ($H \oplus A \ominus$). Suitable organic acids include, for example, alkanoic acids having from 1 to 4 carbon atoms (e.g., acetic acid, propionic acid, etc.), alkenoic acids having up to 5 carbon atoms (e.g., acrylic acid, methacrylic acid, etc.) hydroxy-functional carboxylic acids (e.g., glycolic acid, lactic acid, etc.) and organic sulfonic acids (e.g., methanesulfonic acid), and the like. Presently preferred acids are lower alkanoic acids of 1 to 4 carbon atoms with lactic acid and acetic acid being most preferred. The anion can be exchanged, of course, by conventional anion exchange techniques. See, for example, U.S. Pat. No. 3,959,106 at column 19. Suitable anions are chloride, bromide, bisulfate, bicarbonate, nitrate, dihydrogen phosphate, lactate and alkanoates of 1–4 carbon atoms. Acetate and lactate are the most preferred anions.

The conversion reaction to form cationic resins is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from 25° C. to 100° C., with preferred reaction rates being observed at temperatures from 60° to 80° C.

Good results can be achieved by using substantially stoichiometric amounts of reactants although a slight excess of deficiency of the epoxy-containing resin or the nucleophilic compound can be used. With weak acids, useful ratios of the reactants range from 0.5 to 1.0 equivalent of nucleophilic compound per oxide group of the resin and 0.6 to 1.1, equivalents of organic acid per epoxide. These ratios, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophilic compound and the epoxy group of the resin. When the nucleophilic compound is a secondary amine, the amine-epoxy reaction can be conducted first, followed by addition of the organic acid to form the salt and thus produce the cationic form of the resin.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from 5 to 30 moles per epoxy equivalent. When the nucleophile is a secondary amine, the water can be added before, during, or after the resin epoxy group/nucleophile reaction. The charge density of the cationic, advanced epoxy resin is usually from about 0.2 to about 0.8, preferably from about 0.2 to about 0.7, more preferably from about 0.3 to about 0.7 milliequivalent of charge per gram of the resin.

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included. One class of solvents that we have found particularly beneficial are the monoalkyl ethers of the $C_2$-$C_4$ alkylene glycols. This class of compounds includes, for example, the monomethyl ether of ethylene glycol, the monobutyl ether of ethylene glycol, etc. A variety of these alkyl ethers of alkylene glycols are commercially available.

When a desired degree of reaction is reached, any excess nucleophilic compound can be removed by standard methods, e.g., dialysis, vacuum stripping and steam distillation.

The Other, "Different", Resin

The other resin which is blended with the advanced epoxy cationic resin containing the glycidylether of an oxyalkylated diol component is broadly characterized as a different cationic cathodically electrodepositable resin. Preferred kinds of the different electrodepositable resins are epoxy-based resins, particularly those resins containing a reacted glycidyl ether of a dihydric phenol which has been advanced with a dihydric phenol such as bisphenol A. Examples of these different cathodically electrodepositable resins include resins like those described above except that they contain none, or less than the minimum amount, of the advanced glycidyl ether of an oxyalkylated diol. Conventional epoxy resins obtained by reacting liquid diglycidyl ethers of bisphenol A with bisphenol A are among the more specific examples of the class of other resins which can be a portion of the blend.

Several kinds of epoxy-based resins which may be used in the blends are described in various patents as follows: Jerabek in U.S. Pat. No. 4,031,050 describes cationic electrodeposition resins which are the reaction products of an epoxy-based resin and primary or secondary amines. U.S. Pat. No. 4,017,438 to Jerabek et al. described reaction products of epoxy-based resins and blocked primary amines. Bosso et al. describe in U.S. Pat. Nos. 3,962,165; 3,975,346; 4,001,101 and 4,101,486 cationic electrodeposition resins which are reaction products of an epoxy-based resin and tertiary amines. Bosso et al. in U.S. Pat. No. 3,959,106 and DeBona in U.S. Pat. No. 3,793,278 describe cationic electrodeposition resins which are epoxy-based resins having sulfonium salt groups. Wessling et al. in U.S. Pat. No. 4,383,073 describes cationic electrodeposition resins which are epoxy-based resins having carbamoylpyridinium salt groups. U.S. Pat. No. 4,419,467 to Bosso et al. discusses epoxy-based resins reacted with primary, secondary and tertiary amine groups as well as quaternary ammonium groups and ternary sulfonium groups. U.S. Pat. No. 4,076,676 to Sommerfeld describes aqueous dispersions of epoxy-based cationic resins which are the reaction products of a terminally functional epoxy resin, a tertiary amine and a nitrogen resin. U.S. Pat. No. 4,134,864, to Belanger, describes reaction products of epoxy-based resins, polyamines and a capping agent. Still other suitable resins for use in the blends of this invention are described in the patents in the following list, all of which are incorporated herein by reference.

| U.S. Pat. No. | Patentee |
| --- | --- |
| 4,182,831 | Hicks |
| 4,190,564 | Tominaga et al. |
| 4,296,010 | Tominaga |
| 4,335,028 | Ting et al. |
| 4,339,369 | Hicks et al. |

Preparing the Blends

The blends of the required, "additive", resin containing the advanced glycidyl ether of an oxyalkylated diol and the other, "different", resin can be prepared in any one of several ways.

To prepare the desired product in an aqueous dispersion can involve the following steps:
1. preparing the non-cationic resin;
2. converting the non-cationic resin to a cationic resin;

3. converting the cationic resin to a water-in-oil dispersion of the resin; and
4. converting the water-in-oil dispersion to an oil-in-water dispersion.

The blending of the required, "additive", resin and the other, "different", resin can occur with the resins at the same stage after step 1, after step 2, after step 3 or after step 4. Thus resins of the two types may be blended (a) as non-cationic resins, (b) as cationic resins (c) as water-in-oil dispersions of the cationic resins or (d) as oil-in-water dispersions. Subsequent steps are then carried out on the blended material (except for (d)), to form the desired product as an aqueous dispersion. These aqueous dispersions may be treated further as desired according to the discussion below in other embodiments of this invention.

The blending of the resins generally involves only gentle mixing. When blending is done with the non-cationic resins or with the cationic resins which are not yet in aqueous dispersion, a solvent for the resins optionally may be used to facilitate the mixing.

The amount of the additive cationic resin will depend upon the amount of component (A1) employed to produce the additive cationic resin, component (I). Thus, when high levels of component (A1), for example 60 to 100 percent are utilized to prepare the additive resin, component (I), it is only necessary to utilize from 10 to 70 weight percent, preferably from 20 to 60 weight percent of the additive resin, component (I) in the blend of the "additive" resin and the "different" resin, component (II). However, when low levels of component (A1), for example when 20 percent by weight of component A1 is employed to prepare the component I, it can be employed in the blend in amounts of from about 40 to about 90 percent by weight based upon the combined weight of components (I) and (II). On the other hand, when 30 percent by weight of component A1 is employed to prepare the "additive" resin, component I, it can be employed in the blend in amounts of from about 30 to about 90 percent by weight based upon the combined weight of components (I) and (II). Therefore, as a rule of thumb, the amount of "additive", component (I), resin which can be employed in a blend of said "additive" resin, component (I), and "different" resin, component (II), is a number from about 8 to about 60, preferably from about 10 to about 55, more preferably from about 15 to about 50. For a lack of a better term this number shall referred to as the "blend" number and is calculated by multiplying the weight percent of component (A1) in component (I) times the weight percent of component (I) in a blend of components (I) and (II) times 100.

The blends of resins of this invention in the form of aqueous dispersions are useful as coating compositions, especially when applied by electrodeposition. The coating compositions containing the blends of this invention as the sole resinous component are useful but it is preferred to include crosslinking agents in the coating composition to facilitate curing so that the coated films will be crosslinked and exhibit improved film properties. The most useful sites on the resin for crosslinking reactions are the secondary hydroxyl groups along the resin backbone. Materials suitable for use as crosslinking agents are those known to react with hydroxyl groups and include blocked polyisocyanates; amine-aldehyde resins such as melamine-formaldehyde, urea-formaldehyde, benzoguanine-formaldehyde, and their alkylated analogs; and phenol-aldehyde resins.

Particularly useful and preferred crosslinking agents are the blocked polyisocyanates which, at elevated temperatures, deblock and form isocyanate groups which react with the hydroxyl groups of the resin to crosslink the coating. Such crosslinkers are typically prepared by reaction of the polyisocyanate with a monofunctional active-hydrogen compound.

Examples of polyisocyanates suitable for preparation of the crosslinking agent are described in U.S. Pat. No. 3,959,106 to Bosso, et al., in Column 15, lines 1-24. Also suitable are isocyanate-functional prepolymers derived from polyisocyanates and polyols using excess isocyanate groups. Examples of suitable prepolymers are described by Bosso, et al., in U.S. Pat. No. 3,959,106, Column 15, lines 25-27. In the preparation of the prepolymers, reactant functionality, equivalent ratios, and methods of contacting the reactants must be chosen in accordance with considerations known in the art to provide ungelled products having the desired functionality and equivalent weight.

Examples of polyisocyanates are the isocyanurate trimer of hexamethylene diisocyanate, toluene diisocyanate, methylene diphenylene diisocyanate, isophorone diisocyanate, and a prepolymer from toluene diisocyanate and polypropylene glycol, dipropylene glycol, tripropylene glycol or a prepolymer of toluene diisocyanate and trimethylolpropane.

Suitable blocking agents include alcohols, phenols, oximes, lactams, and N,N-dialkylamides or esters of alpha-hydroxyl group containing carboxylic acids. Examples of suitable blocking agents are described in U.S. Pat. No. 3,959,106 to Bosso, et al., in Column 15, line 58, through Column 16, line 6, and in U.S. Pat. No. 4,452,930 to Moriarity. Particularly useful are the oximes of ketones, also known as ketoximes, due to their tendency to deblock at relatively lower temperatures and provide a coating composition which can be cured at significantly lower temperatures. The particularly preferred ketoxime is methyl ethyl ketoxime.

The blocked polyisocyanates are prepared by reacting equivalent amounts of the isocyanate and the blocking agent in an inert atmosphere such as nitrogen at temperatures between 25° to 100° C., preferably below 70° C. to control the exothermic reaction. Sufficient blocking agent is used so that the product contains no residual, free isocyanate groups. A solvent compatible with the reactants, product, and the coating composition may be used such as a ketone or an ester. A catalyst may also be employed such as dibutyl tin dilaurate.

The blocked polyisocyanate crosslinking agents are incorporated into the coating composition at levels corresponding to from 0.2 to 2.0 blocked isocyanate groups per hydroxyl group of the cationic resin.

A catalyst optionally may be included in the coating composition to provide faster or more complete curing of the coating. Suitable catalysts for the various classes of crosslinking agents are known to those skilled in the art. For the coating compositions using the blocked polyisocyanates as crosslinking agents, suitable catalysts include dibutyl tin dilaurate, dibutyl tin diacetate, dibutyl tin oxide, stannous octanoate, and other urethane-forming catalysts known in the art. The preferred catalyst is dibutyl tin dilaurate. Amounts used typically range between 0.1 and 3 weight percent of binder solids.

Unpigmented coating compositions are prepared by mixing the cationic resin blend with the crosslinking agent and optionally any additives such as catalysts, solvents, surfactants, flow modifiers, defoamers, or other additives. This mixture is then dispersed in water by any of the know methods. A particularly preferred method is the technique known as phase-inversion emulsification, wherein water is slowly added with agitation to the above mixture, usually at temperatures ranging from ambient to 90° C., until the phases invert to form an organic phase-in-water dispersion. The solids content of the aqueous dispersion is usually between 5 and 30 percent by weight and preferably between 10 and 25 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigment grinding vehicles are known in the art. A preferred pigment grinding vehicle for use in this invention consists of a water-soluble cationic resinous product, water, and a minor amount of glycol ether solvent. The cationic resinous product is prepared by reacting an epichlorohydrin/bisphenol A condensation product having an epoxide group content of 8 percent with a nucleophilic compound, an acid, and water in a similar fashion as described above for the cationic resins used in the preferred embodiment of the invention. The water-soluble product may be diluted with water to form a clear solution useful as a pigment grinding vehicle.

The pH and/or conductivity of the coating compositions can be adjusted to desired levels by the addition of compatible acids, bases, and/or electrolytes known in the art. Other additives such as solvents, surfactants, defoamers, anti-oxidants, bactericides, etc. may also be added to modify or optimize properties of the compositions or the coating in accordance with practices known to those skilled in the art.

Although the coating compositions of the invention can be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage may range from 10 to 1,000 volts, typically 50 to 500. The film thickness achieved generally increases with increasing voltage. In the case of the coating compositions of the invention, thicker films are achieved by incorporation of the diglycidyl ether of an oxyalkylated diol into the epoxy resin used to produce the cationic resins of the invention. Also, control over the final thickness may be exercised by adjusting the amount of that component used. Current is allowed to flow for between a few seconds to several minutes, typically two minutes, over which time the current usually decreases. Any electrically conductive substrate may be coated in this fashion, especially metals such as steel and aluminum. Other aspects of the electrodeposition process, such as bath maintenance, are conventional. After deposition, the article is removed from the bath and typically rinsed with water to remove that coating composition which does not adhere.

The uncured coating film on the article is cured by heating at elevated temperatures, ranging from about 200° to 400° F. (93° C. to 204° C.), for periods of 10 to 60 minutes.

The following examples are illustrative of the invention, but are not to be construed as to limiting the scope thereof in any manner.

PIGMENT VEHICLE A

Into a 5 liter, round-bottomed flask equipped with condenser, addition funnel, nitrogen inlet, mechanical stirrer, and thermometer is charged 920.5 g D.E.R. 361 (a commercially available epoxy resin having an epoxide equivalent weight of 188) and 298.1 g bisphenol A. The mixture is heated under nitrogen to 85° C. and 1.44 g of a 70% solution of ethyl triphenylphosphonium acetate-acetic acid complex in methanol is added. The mixture is heated to 150° C. and allowed to exotherm to 184° C. The temperature is brought down to 175° C. and the reaction is maintained at 175° C. for one hour. The resin is cooled to 83° C. and diluted with 304.6 g methyl ethyl ketone. The solution is cooled to 65° C. and 167.5 g 2-(methylamino)ethanol is added over 19 minutes at 65°-70° C. The reaction is heated to 80°-84° C. for 65 minutes. The solution is then cooled to 75° C. and 276.8 g of 72.5% lactic acid solution in water is added. The mixture is then diluted with water to an approximately 40% non-volatile content to produce a clear, viscous solution.

PIGMENT DISPERSION A

Into a one gallon, metal paint can is placed 698.0 g of pigment vehicle A, 108.3 g ASP 200 clay, 41.9 g EP 202 lead silicate, 14.7 g Raven 410 carbon black, and 537.0 g R-900 titanium dioxide. A volume of about one-half the bulk pigment volume of chrome-plated steel diagonals is added and the pigments are ground dispersed by shaking the sealed paint can on a paint shaker. Water is added as the grinding progresses until a total of 186.0 g of water has been added. The diagonals are removed by passing the dispersion through a screen. The pigment dispersion contained 44.2 percent pigments by weight.

CURING AGENT A

Toluene diisocyanate (1363.1 g) is charged to a 5 liter, round-bottomed flask equipped with a condenser, mechanical stirrer, nitrogen inlet, addition funnel and thermometer. The material is heated to 58° C. and a mixture of 308.9 g of polypropylene glycol of average molecular weight of 400 and 1.29 g T-12 catalyst is added dropwise with cooling to maintain 58° C. An additional 523.5 g of the polypropylene glycol is added afterward. The total time for the two feeds is 140 minutes. 2-Ethylhexanol (1527.6 g) is then added over a period of 220 minutes at 58°-63° C. The reaction mixture is then heated at 73° C. for 45 minutes and the resulting blocked isocyanate crosslinker is a clear, viscous liquid at room temperature.

COATING THE COMPOSITIONS

The coating compositions are placed in a stainless steel tank, agitated, and maintained at 80° F. (27° C.). Unpolished steel test panels from Advanced Coating Technologies, Inc. having Bonderite TM 40 treatment and P60 rinse are immersed in the tank and connected as the cathode to a D.C. voltage source, with the tank walls serving as the anode. The desired voltage is applied for two minutes, then the panels are removed, rinsed with deionized water, and baked at the specified temperature for 30 minutes.

COMPARATIVE EXPERIMENT A (Not an example of the present invention)

Preparation of Advanced Cationic Resin Dispersed in Water

Into a 2 liter, round bottom flask is charged 161.4 g of the diglycidyl ether of an adduct of one mole bisphenol A and six moles ethylene oxide and 38.6 g bisphenol A. The mixture is heated under nitrogen to 97° C. and 0.32 g of a 70 percent solution of ethyl triphenylphosphonium acetate·acetic acid complex in methanol is added. The mixture is heated to 175° C. over 37 minutes and held for 53 minutes, at which time the epoxide equivalent weight is 1530. An additional 0.1 g of the 70 percent catalyst solution is added and reaction is continued for 25 minutes, at which time the epoxide equivalent weight is 1590. The product is cooled and diluted with 28.7 g ethylene glycol hexyl ether and 21.5 g propylene glycol methyl ether. The solution is cooled to 85° C. and 9.5 g 2-(methylamino)ethanol is added. The temperature is maintained at 85° to 89° C. for 70 minutes. Curing Agent A (89.2 g), T-12 catalyst (4.6 g), and 15.5 g of 73.4 percent lactic acid solution mixed with 16.5 g of water are then added sequentially and mixed at 85° C. Water is added dropwise over a period of 55 minutes at 60° to 70° C. until the mixture inverted to an aqueous dispersion. The dispersion is cooled and further diluted with water to an approximately 18 percent non-volatile content.

Preparation and Testing of Coating

The aqueous dispersion (1684.3 g) is pigmented with 158.8 g of pigment dispersion A and panels are electrocoated and cured at 177° C. for thirty minutes. The coatings have the film thicknesses given in Table I.

TABLE I

| Deposition Voltage (volts) | Film Thicknesses (mils) |
|---|---|
| 50 | 0.90 |
| 75 | ruptured |
| 150 | ruptured |

The resultant coatings are rough and show evidence of extreme gassing during deposition. The coatings withstood 10 MIBK double rubs without marring but show marring after 20 double rubs. The coatings show 3/16 to ¼ inch total corrosion creep (both sides) after 330 hours of salt spray exposure, ½ inch after 502 hours, and complete loss of coating adhesion after 714 hours. Thus, this material is not useful as a coating composition alone because of the low rupture voltage. This material is; however, useful as an additive to another cathodic electrodeposition coating composition to increase film thickness, as demonstrated in Example 1.

COMPARATIVE EXPERIMENT B (Not an example of the present invention)

To a 2 liter, round-bottomed flask equipped with a mechanical stirrer, condenser, nitrogen inlet, and a thermometer is charged 665.1 grams of D.E.R. ™ 331 (a liquid epoxy resin having an epoxide equivalent weight of 187 available from the Dow Chemical Company) and 335.2 g bisphenol A. The mixture is heated under a nitrogen atmosphere to 97° C. and 1.66 g of a 70 percent solution of ethyltriphenyl phosphonium acetate·acetic acid complex in methanol is added. The mixture is heated to 135° C. and allowed to exotherm to 194° C. The temperature is allowed to fall to 175° C. and maintained at that temperature for one hour. The product is isolated by cooling and flaking. The solid epoxy resin have an epoxide equivalent weight of 1650.

A portion (230.3 grams) of this solid epoxy resin is heated and dissolved in 24.7 grams of propylene glycol methyl ether and 32.9 g ethylene glycol hexlyether in a similar reactor. At 86° C., 10.5 g of 2-(methylamino)ethanol is added over a period of ten minutes. The reaction mixture is then held at 90° to 100° C. for 90 minutes. The product is cooled to 80° C. and 101.3 g of curing agent A is added and mixed. T-12 catalyst (Air Products) (5.3 g) and 17.1 g of 73.4 percent lactic acid are added sequentially. Water is then added dropwise over a period of two hours at 71° to 79° C. until the mixture inverted to form a milky, aqueous dispersion. The dispersion is cooled and further diluted with water to form an approximately 18 percent non-volatile product.

This aqueous dispersion (1958.1 g) is pigmented by adding 178.3 g of pigment dispersion A with stirring. Cold rolled steel test (27° C.) panels (B40 treatment, P60 rinse) are electrocoated at 80° F. (27° C.) for two minutes as the cathode at various voltages in the resulting bath. The coatings are cured at 177° C. for thirty minutes. The resulting film thickness are given in the following Table II.

TABLE II

| Deposition Voltage | Film Thickness (mils) |
|---|---|
| 200 | 0.19 |
| 225 | 0.18 |
| 250 | 0.19 |
| 275 | 0.22 |
| 300 | 0.25 |

The coatings have a slight orange peel texture, but are free of pinholes, and the current cutoff during deposition and the film thicknesses are indicative of adequate coalescence upon deposition. The coatings passed 20 MIBK double rubs without marring but show some dulling at 50 double rubs. The coating demonstrated 1/32 inch corrosion creep (total of both sides of scribe) after 717 hours of salt spray testing under ASTM B-117.

EXAMPLE 1

The pigmented dispersion of Comparative Experiment A (145.0 g) is added to the pigmented dispersion of Comparative Experiment B (1305.0 g) to provide a pigmented dispersion in which 10 percent of the final dispersion is provided by the material of Comparative Experiment A, in order to demonstrate its utility as an additive to increase the film thickness of a low build system. Panels are electrocoated and cured as previously described. An additional 181.3 g of the pigmented dispersion of example 1 is then added to the bath in order to raise the content of the additive to 20 percent of the total. Panels are again coated and then an appropriate amount of the additive (material of Comparative Experiment A) is added to the bath to raise the level to 30 percent. The process is again repeated at the 40 percent level. The film thicknesses at various voltages for each level of additive are shown in the following Table III.

TABLE III

| Voltage (volts) | Film Thickness in mils at additive Level (% of total bath) | | | | |
|---|---|---|---|---|---|
| | 0* | 10 | 20 | 30 | 40 |
| 150 | — | — | — | — | 0.50 |
| 175 | — | — | — | — | 0.72 |
| 200 | 0.16 | 0.16 | 0.25 | 0.41 | 0.97 |
| 250 | 0.20 | 0.26 | 0.38 | 0.58 | — |
| 300 | 0.25 | 0.32 | 0.47 | — | — |

*Not an example of the invention.

The coatings are progressively smoother and more glossy with increasing level of the additive. The rupture voltage dropped with increasing level of the additive. At 30 and 40 percent, the rupture voltages are 280 and 200 volts, respectively. All of the coatings withstood 50 MIBK double rubs, but show some marring at 100. The salt spray test results are shown in the following Table IV.

TABLE IV

| Level of additive %/ Hours of Exposure | Corrosion from scribe in inches (total both sides) |
|---|---|
| 0/717* | 1/32 |
| 10/714 | 1/64 |
| 20/714 | 1/64 |
| 30/714 | 1/64–1/32 |
| 40/714 | 1/32 |

*Not an example of the invention.

EXAMPLE 2

A. Preparation of a conventional cationic resin dispersion ("Other Resin")

A cationic resin having an epoxide equivalent weight of 1745 used as a control was prepared in a manner similar to Comparative Experiment A. The solid resin (244.3 g, 0.14 eq) was dissolved by heating with 57.6 g of the butylether glycol. The solution of the solid epoxy resin was reacted with 10.5 g (0.14 eq) of 2-(methylamino)ethanol followed by the addition of 105.6 g of an isocyanate terminated prepolymer prepared from toluene diisocyanate and a polyoxypropylene glycol having a weight average molecular weight of 425 said prepolymer being capped with 2-ethylhexanol, 5.3 g of dibutyl tin dilaurate catalyst, and 171 g (0.14 eq) of 73% aqueous lactic acid. A dispersion was prepared by the addition of 1661 g of water to provide a cationic electrodeposition dispersion containing 18% solids in water. This was labeled control dispersion.

B. Preparation of cationic resin of the present invention (additive resin)

Into a five liter glass reactor was charged 153.6 g (0.82 equiv.) of D.E.R. 331 epoxy resin, which is substantially the diglycidyl ether of bisphenol A having an EEW of 187, 230.4 g (0.676 equiv.) of a product which is substantially the diglycidyl ether of an adduct of one mole bisphenol A with 3.4 moles propylene oxide, said diglycidyl ether having an epoxide equivalent weight of 341 and 116.1 g of bisphenol A. The reaction mixture was stirred and heated to 90° C. under nitrogen and 1.05 g of a 70 wt % solution of ethyltriphenylphosphonium acetate~acetic acid complex in methanol was added. The mixture was heated to 150° C. and allowed to exotherm at which time the epoxide content was 4.08 percent, as oxirane, (1,054 EEW). The product was then cooled and diluted with 24.0 g xylene and 157.0 g of methyl isobutyl ketone (MIBK). The solution was then brought to 100° C. and 49.4 g diethanolamine was added. The reaction mixture was maintained at 100° C. for 110 minutes. The product solution was collected and cooled to form a viscous, light yellow solution.

C. Preparation of cationic dispersion

A 2-liter flask was charged with 250 g of the resin in B above and 80.8 g of crosslinker, 3.8 g of dibutyltin dilaurate, and 14.6 g of a 73% solution of lactic acid water. The mixture was heated to 70° C. and water gradually added until a total 797.1 g of water had been added to provide a dispersion of 187 solids material in water. This dispersion was labeled additive dispersion.

D. Coating of panels

Blends were then prepared by adding various amounts of the additive dispersion (C) to the control dispersion (A). Both dispersions were at a solids level of 18%. The dispersions were coated onto Bonderite 40 treated steel panels at 80° F. and at 250 volts. They were then cured at 360° F. for 30 minutes. The distinctness of image (DOI), a measure of appearance, was determined by ASTM E 430-78 using a Hunter Laboratory Dori-Gon Meter, Model D 47-6 at four different positions on the panel and averaged. The results are given in Table V.

TABLE V

| Sample No. | Amount of Control Dispersion, % by weight | Amount of Additive Dispersion, % by weight | DOI$^a$ | % Improvement over Control |
|---|---|---|---|---|
| 1* | 100 | 0 | 50.2 | — |
| 2 | 80 | 20 | 74.2 | 48 |
| 3 | 60 | 40 | 83.9 | 67 |
| 4 | 40 | 60 | 85.3 | 70 |

*Not an example og the present invention.
$^a$100 = DOI of a perfect mirror.

EXAMPLE 3

A. Preparation of a conventional amine,cationic, resin ("Other Resin")

A 1 L round bottom flask was charged with 341.6 g. (1.85 equiv.) of a diglycidyl ether of bisphenol A (EEW 185) and 158.4 g. (1.39 equiv.) of bisphenol A. The mixture was heated to 96° C. whereupon 0.96 g. of a 70% solids (non-volatiles) solution of ethyltriphenyl phosphonium acetate·acetic acid complex in methanol was added. Heating was continued until the temperature reached 150° C. whereupon the temperature exothermed to 194° C. After the exotherm had subsided, heating was continued at 175° C. for one hour at which point the resin had an EEW of 1211. The mixture was allowed to cool to 155° C. and 223.5 g. of methyl isobutyl ketone (MIBK) was gradually added to provide a 70% solids solution. The solution was cooled to 95° C. and 48.3 g. (0.46 equiv., 0.46 mole) of diethanolamine was added. The temperature gradually rose to 100° C. where it was maintained for 4.5 hours.

B. Preparation of Additive Amine Resin ("Additive Resin")

An additive epoxy resin was prepared as in Experiment IA using 313 g. (1.66 equiv.) of a diglycidyl ether of bisphenol A (EEW=189), 450.5 G. (1.32 equiv.) of a diglycidyl ether of a diol prepared by reacting bisphenol A with 3.4 moles of propylene oxide (EEW=341), and 236 g. (2.07 equiv.) of bisphenol A. The advanced epoxy resin had an epoxide equivalent weight of 1049. Methyl isobutyl ketone (MIBK) 367 g was added to provide a 70% solids solution. The epoxy resin was reacted with 100 g. (0.952 equiv., 0.952 mole) of diethanolamine as in the preparation of the conventional amine resin IA to provide a additive amine resin.

C. Preparation of Curing Agent

A solution of Luprenate ™ MI, (1610 g., 12.0 equivs.), (a methylenediphenyl diisocyanate having an isocyanate equivalent weight of 125 and consisting of a mixture of about 48% p,p'-methylene diphenyl diisocyanate, 50% o,p-methylenediphenyl diisocyanate and 2% other isomers) in 1302 g of methylisobutyl ketone (MIBK) was reacted with 86.3 g (0.128 equiv.) of dipropylene glycol and 123.7 g (0.128 equiv.) of tripropylene glycol. After addition of the diols was complete, 1216 g. (10.31 equiv.) of 2-butoxyethanol was added and heating continued at 70° C. until the infrared spectrum indicated the absence of isocyanate groups.

D. Preparation of Dispersions

Aqueous dispersion of the Amine Resins prepared in (A) and (B) above were prepared at a 32% solids level by the procedure described in Comparative Experiment A on pages 38 to 39 of application Ser. No. 07/464,501 filed Jan. 12, 1990 utilizing the ingredients shown in Table VI.

TABLE VI

|  | Dispersion | |
|---|---|---|
|  | 1 grams | 2 grams |
| Conventional ("Other") Amine Resin Solution, A | 285 | — |
| Additive Amine Resin Solution, B | — | 285 |
| Curing Agent, C | 166 (0.656 equiv.) | 157 (0.621 equiv.) |
| Phenoxypropanol | 13.1 | 12.4 |
| Surfactant Blend[a] | 4.2 | 4.0 |
| Lactic Acid (85% Aqueous) | 14.2 (0.13 equiv.) | 11.8 (0.11 equiv.) |
| Deionized Water | 539.6 | 497.6 |

[a]A blend of 80 g of Amine C ™ commercially available from Ciba Geigy, 14.7 g of acetic acid, 105 g of 2-butoxyethanol, 80 g of Surfynol ™ 104 commercially available from Air Products, and 223 g of deionized water.

The dispersions were then placed in a hood to evaporate the MIBK solvent. Sufficient deionized water was then added to replace that which had evaporated with the MIBK. The dispersions were then pigmented with 101 g. of a commercial pigment paste available from PPG Industries as ED-4. An additional 851 g. of deionized water was added to reduce the dispersion to 20% solids.

E. Preparation of Coatings

The two dispersions prepared in (D) above were each separately coated onto Bonderite ™ 952 panels at various voltages. The coatings were baked at 350° F. (177° C.) for 30 minutes and the film thickness measured. Blends of these two dispersions (examples of the present invention) were then made and coated in a similar manner. The results shown in Table II clearly indicate that dispersion 1, prepared from the conventional amine resin (A), will produce only low film thickness coatings while dispersion 2, prepared from the additive cationic resin (B), ruptures at a relatively low voltage. Higher coating voltages are desirable to give increased throw. However, blends of dispersion 2, prepared from the "additive" cationic resin (B), and dispersion 1, prepared from the unmodified cationic resin (A), "other" resin, produce coatings which have controlled and increased film build relative to a dispersion 1, prepared from an unmodified, "other", resin and improved rupture voltage relative to dispersions, 2, of the additive resin along.

TABLE VII

| Coating No. | Weight Percent of Dispersion 1[a] | Weight Percent of Dispersion 2[b] | Film Thickness[c] at Indicated Coating Voltage | | | | | | | |
|---|---|---|---|---|---|---|---|---|---|---|
|  |  |  | 200V | 225V | 250V | 275V | 300V | 325V | 350V | 375V |
| 1* | 100 | 0 | 0.28 7.1 | 0.28 7.1 | 0.28 7.1 | 0.28 7.1 | 0.28 7.1 | — | — | 0.39 9.9 |
| 2 | 50 | 50 | 0.34 8.6 | 0.37 9.4 | 0.42 10.7 | 0.45 11.4 | 0.51 13.0 | 0.55 14.0 | 0.61 15.4 |  |
| 3 | 30 | 70 | 0.57 14.1 | 0.66 16.8 | 0.77 19.6 | 0.94 23.9 | R[d] |  |  |  |
| 4 | 10 | 90 | 0.90 22.8 | 1.04 26.4 | 1.16 29.5 | R[d] |  |  |  |  |
| 5* | 0 | 100 | 1.00 25 | 1.13 28.7 | R[d] |  |  |  |  |  |

*Not an example of the present invention.
[a]Dispersion 1 is the control ("other") dispersion at 20% solids.
[b]Dispersion 2 is the "additive" dispersion at 20% solids.
[c]The first number is mils and the second number is millimeters.
[d]Coating film ruptured.

EXAMPLE 4

A. Preparation of Cationic Resin Containing 20 wt % of Component A-1 (Resin A)

Diglycidyl ether of bisphenol A having an EEW of 185 (430.5 g, 2.33 eq), diglycidyl ether of an adduct of one mole bisphenol A with about eleven moles ethylene oxide (107.3 g, 0.22 eq), said diglycidyl ether having an EEW of 448, and bisphenol A (212.3 g, 1.86 eq), were charged to a suitable reactor and heated to 83° C. under nitrogen. Ethyltriphenylphosphonium acetate—acetic acid complex (1.04 g of a 70% solution in methanol) was added and the mixture heated to 150° C. The reaction mixture exothermed to 195° C. and was then maintained at 175° C. for 46 minutes. The epoxide equivalent weight at this point was 1177. The resin was cooled and diluted with 139.4 g of methylisobutylketone. Diethanolamine (65.7 g, 0.62 eq) was added at 100° C. and the reaction mixture was maintained at 100° C. for 2.6 hours. The resin solution was further diluted with 123.8 g of methylisobutylketone and collected.

B. Preparation of Cationic Resin Containing 30 wt % of Component A-1 (Resin B)

Diglycidyl ether of bisphenol A having an EEW of 185 (383.5 g, 2.07 eq), diglycidyl ether of an adduct of one mole bisphenol A with about eleven moles ethylene oxide (168.5 g, 0.34 eq), said diglycidyl ether having an EEW of 488, and bisphenol A (198.1 g, 1.74 eq), were charged to a suitable reactor and heated to 90° C. under nitrogen. Ethyltriphenylphosphonium acetate-acetic acid complex (0.99 g of a 70% solution in methanol) was added and the mixture heated to 150° C. The reaction mixture exothermed to 190° C. and was then maintained at 175° C. for 46 minutes. The epoxide equivalent weight at this point was 1181. The resin was cooled and diluted with 139.5 g of methylisobutylketone. Diethanolamine (64.5 g, 0.61 eq) was added at 95° C. and the reaction mixture was maintained at 100° C. for 3.15 hours. The resin solution was further diluted with 124 g of methylisobutylketone and collected.

C. Preparation of Blocked-Isocyanate Curing Agent

Methylenediphenylene diisocyanate having about 50% by weight content of 2, 4' isomer (1591.5 g, 12.7 eq) and methylisobutylketone (1286.1 g) were charged to a suitable reactor and heated to 60° C. Dibutyltin dilaurate (1.6 g) was added. A mixture of dipropylene glycol (85.3 g, 1.27 eq) and tripropylene glycol (122.2 g, 1.27 eq) was then added over a period of 23 minutes while maintaining the reaction at 54°–60° C. Butoxyethanol (1201.9 g, 10.2 eq) was then added over a period of 67 minutes while maintaining the reaction below 65° C. The temperature was then raised to 70° C. for 75 minutes. An infrared spectral analysis of the product solution showed no detectable isocyanate. The product solution was collected.

D. Preparation of Control, "Other" Cationic Resin

A Diglycidyl ether of bisphenol A having an EEW of 185 (684 g, 3.68 eqs) and bisphenol A (316 g, 2.77 eq) were reacted as in the preparation of Resin A. After cooling the resultant resin which has an epoxide equivalent weight of 1160 was diluted with 459 g of MIBK to provide a resin solution at 70% solids. This epoxy was further reacted with 88.6 g (0.84 eq) of diethanolamine and then diluted further with 200 g of MIBK. A cationic description was prepared below.

E. Preparation of Cationic Dispersion

Dispersions were prepared from Cationic Resins A and B and the control, "other" cationic resin as described previously in C36,244A using the quantities given in Table VIII. All parts are by weight.

TABLE VIII

|  | DISPERSION A | DISPERSION B | CONTROL "Other" DISPERSION |
|---|---|---|---|
| Resin A (77% solids) | 285 | | |
| Resin B (76.5% solids) | | 285 | |
| Control Resin (77% Solids) | | | 580 |
| 2-Phenoxyethanol | 17.0 | 17.0 | 31.5 |
| Blocked Isocyanate Curing Agent (70% solids) | 172.4 | 171 | 319 |
| Additive[a] | 5.1 | 5.1 | 9.4 |
| T-12 Catalyst[b] | 4.6 | 4.5 | 8.5 |
| Lactic Acid | 13.9 | 13.8 | 27.1 |

TABLE VIII-continued

|  | DISPERSION A | DISPERSION B | CONTROL "Other" DISPERSION |
|---|---|---|---|
| (85%-aqueous) | 498 | 496.3 | 975.5 |
| Deionized Water | 569 | 564.4 | 991.6 |

[a] A surfactant blend prepared by blending 80 g of Amine C (Ciba-Geigy) 222 g of deionized water, 14.7 g acetic flask and heated to 75° with stirring whereupon 80 g of Surfynol 104 (Air Products Co.) was added and heating was continued until a clear solution was formed.
[b] Dibutyltin dilaurate from Air Products Co.

E. Pigmentation of Cationic Dispersions

The above dispersions were then stirred in a hood under a stream of nitrogen for 2 days to remove the MIBK solvent. Additional deionized water was added to restore the bath to its original concentration. These were then pigmented using a commercial pigment grind (paste) designated as ED 4 from PPG Industries.

The quantities of pigment paste and additional deionized water were added to provide a pigmented dispersion at 20% solids are given in Table IX.

TABLE IX

|  | RESIN A DISPERSION | RESIN B DISPERSION | CONTROL "OTHER" RESIN DISPERSION |
|---|---|---|---|
| Pigment paste, g | 170 | 170 | 322 |
| Water, g | 538 | 536 | 1013 |

E. Coating of Panels

Blends were prepared utilizing Dispersion A in combination with the control, "other", dispersion and Dispersion B in combinations with the control, "other", dispersion. The dispersions were coated on to steel panels having a Bonderite TM treatment at 225, 250, 275, and 300 volts. The panels were baked for 30 minutes at 350° F. and their film thickness measured. The data for blends of Dispersion A (made from Resin A) are listed in Table X, while those from Dispersion B (made from Resin B) are listed in Table XI.

TABLE X

FILM BUILD OF CED SYSTEMS FROM RESINS CONTAINING 20 WT PERCENT OF FLEXIBILIZER

| WT % ADDITIVE RESIN A[a] | WT % CONTROL "Other" RESIN[b] | FILM THICKNESS at COATING VOLTAGE[c] | | | |
|---|---|---|---|---|---|
|  |  | 225 | 250 | 275 | 300 |
| 0* | 100 | .16 | .18 | .23 | .22 |
| 20 | 80 | .29 | .25 | .28 | .34 |
| 30 | 70 | .27 | .29 | .30 | .32 |
| 40 | 60 | .23 | .24 | .28 | .32 |
| 70 | 30 | .39 | .44 | .50 | .55 |
| 90 | 10 | .50 | .54 | .63 | .73 |
| 100 | 0 | .58 | .67 | Ruptured | — |

*Not an example of the present invention.
[a] Additive resin contains 20% of BPA/12 EO DGE
[b] Control is a conventional DER 331 + BPA advanced to 1160 EEW and then reacted with diethanolamine
[c] Dry film thickness (mils)

TABLE XI

FILM BUILD OF CED SYSTEMS FROM RESINS CONTAINING 30 WT PERCENT OF FLEXIBILIZER

| WT % ADDITIVE RESIN B[a] | WT % CONTROL "Other" RESIN[b] | FILM THICKNESS at COATING VOLTAGE[c] | | | |
|---|---|---|---|---|---|
| | | 225 | 250 | 275 | 300 |
| 0* | 100 | .16 | .18 | .23 | .22 |
| 10 | 90 | .22 | .23 | .245 | .30 |
| 20 | 80 | .21 | .23 | .29 | .36 |
| 30 | 70 | .21 | .29 | .36 | .42 |
| 40 | 60 | .36 | .43 | .52 | .61 |
| 70 | 30 | .47 | .57 | .68 | .72 |
| 90 | 10 | .64 | .77 | .87 | 1.3 |
| 100 | 0 | .72 | .82 | Ruptured | — |

*Not an example of the present invention.
[a]Additive resin contains 30% of BPA/12 EO DGE
[b]Control is a conventional DER 331 + BPA advanced to 1160 EEW and then reacted with diethanolamine
[c]Dry film thickness (mils)

What is claimed is:

1. A coating composition suitable for electrodeposition comprising an aqueous dispersion of an advanced epoxy resin prepared from an epoxy resin composition having terminal oxirane groups which includes the step of converting oxirane groups to cationic groups by reacting a nucleophile with at least some of the oxirane groups of the epoxy resin composition wherein an organic acid and water are added during some part of this conversion; wherein said epoxy resin composition is a blend of (I) an advanced epoxy resin obtained by reacting in the presence of a suitable catalyst
  (A) a composition comprising
    (1) from about 20 to 100 weight percent of a diglycidyl ether of (a) an oxyalkylated aromatic diol or (b) an oxyalkylated cycloaliphatic diol or (c) a combination of such diols, which diglycidyl ethers are represented by the following formula III:

FORMULA III $$H_2C\overset{O}{\overset{|}{\underset{R}{-}}}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!C-CH_2\left(O-\underset{R''}{\overset{|}{CH}}-CH_2\right)_m O-Z-$$

$$-O\left(CH_2-\underset{R''}{\overset{|}{CH}}-O\right)_m CH_2-\overset{O}{\underset{R}{\overset{|}{C}}}\!\!\!\!\!\!\!\!\!\!\!\!\!\!\!-CH_2$$

wherein each R is independently hydrogen or an alkyl group having from 1 to about 4 carbon atoms; R'' is hydrogen or an alkyl group having from 1 to 6 carbon atoms; each m is independently an integer from 1 to 15; and Z is a group represented by the following formulas A, B, C, D, E, F, or G:

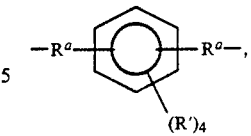

Formula A

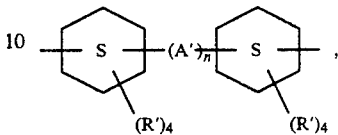

Formula B

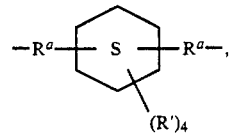

Formula C

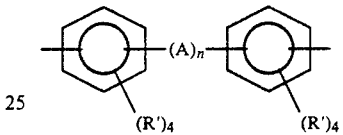

Formula D

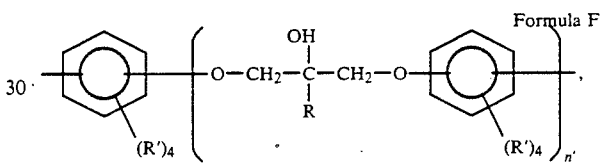

Formula E

Formula F

Formula G

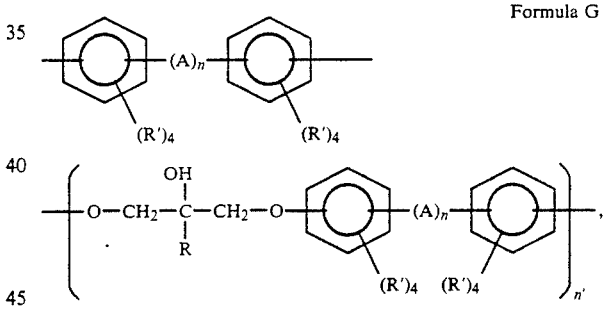

wherein A is a divalent hydrocarbon group having from 1 to 12 carbon atoms, —S—, —S—S—, —SO$_2$—, —SO—, —CO—, —O—CO—O—, or —O—; A' is a divalent hydrocarbon group having from 1 to about 6 carbon atoms; each R is independently hydrogen or a hydrocarbyl group having from 1 to 4 carbon atoms; each R' is independently hydrogen, a hydrocarbyl or hydrocarbyloxy group having from 1 to 4 carbon atoms; R$^a$ is a divalent hydrocarbon group having from 1 to 6 carbon atoms; n has a value of zero or 1; n' has a value from zero to 10; and
    (2) from zero to about 80 weight percent of a diglycidylether of a dihydric phenol; and
  (B) at least one dihydric phenol wherein components (A) and (B) are employed in such quantities that the resultant epoxide equivalent weight is from about 350 to about 10,000, and
(II) a different epoxy-based resin wherein at some time during preparation of the composition, the resins are converted to cationic resins whereby there is obtained a blend of a cationic, advanced epoxy resin and a different cationic epoxy-based resin; said blend containing from about 10 to about 90 percent of (I) and from about 90 to about 10 percent of (II) based on the total weight of cationic resin and having a charge density of from about 0.2 to about 0.8 milliequivalent of charge per gram of resin;

in combination with a curing agent selected from a blocked polyisocyanate, an amine aldehyde resin, and a phenol aldehyde resin.

2. The coating composition of claim 1 in which said blend contains from about 30 to about 70 percent of (I) and from about 70 to about 30 percent of (II) based on the total weight of cationic resin.

3. The coating composition of claim 1 in which said blend contains from about 40 to about 60 percent of (I) and from about 60 to about 40 percent of (II) based on the total weight of cationic resin.

4. The coating composition of claim 1, 2 or 3 in which the curing agent is a blocked polyisocyanate.

5. The coating composition of claim 4 in which the blocked polyisocyanate is a ketoxime-blocked polyisocyanate.

6. The coating composition of claim 5 which also contains a pigment.

7. The coating composition of claim 4 which also contains a pigment.

8. The coating composition of claim 1, 2 or 3 which also contains a pigment.

* * * * *